United States Patent
Dobrinsky et al.

(10) Patent No.: US 9,700,072 B2
(45) Date of Patent: Jul. 11, 2017

(54) MOVABLE ULTRAVIOLET RADIATION SOURCE

(71) Applicant: Sensor Electronic Technology, Inc., Columbia, SC (US)

(72) Inventors: Alexander Dobrinsky, Loudonville, NY (US); Michael Shur, Latham, NY (US); Remigijus Gaska, Columbia, SC (US)

(73) Assignee: Sensor Electronic Technology, Inc., Columbia, SC (US)

( * ) Notice: Subject to any disclaimer, the term of this patent is extended or adjusted under 35 U.S.C. 154(b) by 0 days.

(21) Appl. No.: 14/870,515

(22) Filed: Sep. 30, 2015

(65) Prior Publication Data

US 2016/0088868 A1    Mar. 31, 2016

Related U.S. Application Data

(60) Provisional application No. 62/058,062, filed on Sep. 30, 2014.

(51) Int. Cl.
*A61L 2/10*    (2006.01)
*A23L 3/28*    (2006.01)
*B65D 81/24*   (2006.01)

(52) U.S. Cl.
CPC .............. *A23L 3/28* (2013.01); *B65D 81/24* (2013.01)

(58) Field of Classification Search
CPC ....... A23L 3/28; A23L 3/001; A23V 2002/00; A61L 2/00; A61L 2/0029; A61L 2/0047; A61L 2/02; A61L 2/08; A61L 2/10
USPC .............. 250/453.11, 454.11, 455.11, 492.1, 250/504 R, 504 H
See application file for complete search history.

(56) References Cited

U.S. PATENT DOCUMENTS

| | | | |
|---|---|---|---|
| 2006/0104859 | A1 | 5/2006 | Tribelsky |
| 2009/0257912 | A1 | 10/2009 | Lane et al. |
| 2009/0280035 | A1 | 11/2009 | Koudymov et al. |
| 2010/0242299 | A1* | 9/2010 | Siegel ................. B41F 23/0409 34/275 |
| 2010/0296971 | A1 | 11/2010 | Gaska et al. |
| 2013/0048545 | A1 | 2/2013 | Shatalov et al. |
| 2013/0270445 | A1 | 10/2013 | Gaska et al. |
| 2014/0060094 | A1 | 3/2014 | Shur et al. |

(Continued)

FOREIGN PATENT DOCUMENTS

| | | |
|---|---|---|
| EP | 1469891 B1 | 4/2009 |
| WO | 2007000039 A1 | 1/2007 |

OTHER PUBLICATIONS

Hwang, C., International Application No. PCT/US2015/053120, International Search Report and Written Opinion, Dec. 16, 2015, 14 pages.

*Primary Examiner* — Nicole Ippolito
(74) *Attorney, Agent, or Firm* — Labatt, LLC (57) ABSTRACT

A solution for treating a surface with ultraviolet radiation is provided. A movable ultraviolet source is utilized to emit a beam of ultraviolet radiation having a characteristic cross-sectional area smaller than an area of the surface to be treated. The movable ultraviolet source can be moved as necessary to directly irradiate any portion of the surface with radiation within the characteristic cross-sectional area of the beam of ultraviolet radiation. The movement can include, for example, rotational movement and/or repositioning the movable ultraviolet source with respect to the surface.

20 Claims, 7 Drawing Sheets

(56) References Cited

U.S. PATENT DOCUMENTS

| | | |
|---|---|---|
| 2014/0060095 A1 | 3/2014 | Shur et al. |
| 2014/0060096 A1 | 3/2014 | Shur et al. |
| 2014/0060104 A1 | 3/2014 | Shur et al. |
| 2014/0061509 A1 | 3/2014 | Shur et al. |
| 2014/0183377 A1 | 7/2014 | Bettles et al. |
| 2014/0202962 A1 | 7/2014 | Bilenko et al. |
| 2014/0264070 A1* | 9/2014 | Bettles .................. A61L 2/10 250/430 |
| 2014/0264076 A1 | 9/2014 | Bettles et al. |
| 2015/0008167 A1 | 1/2015 | Shturm et al. |
| 2015/0069270 A1 | 3/2015 | Shur et al. |
| 2015/0165079 A1 | 6/2015 | Shur et al. |
| 2015/0217011 A1 | 8/2015 | Bettles et al. |

* cited by examiner

MOVABLE ULTRAVIOLET RADIATION SOURCE

REFERENCE TO RELATED APPLICATIONS

The current application claims the benefit of U.S. Provisional Application No. 62/058,062, which was filed on 30 Sep. 2014, which is hereby incorporated by reference.

TECHNICAL FIELD

The disclosure relates generally to ultraviolet radiation, and more particularly, to a solution for utilizing a movable ultraviolet radiation source.

BACKGROUND ART

Reliable, hygienic storage of sanitary and biological items, such as food, is a major problem. For example, the problem is present throughout the food industry, e.g., manufacturers, retailers, restaurants, and in every household, and is especially significant for food service establishments, in which related issues of food quality control also are significant. In addition to food storage and quality control in fixed locations (e.g., a refrigerator) where access to electricity is readily available, proper food storage and quality control also is important in situations for which access to unlimited electricity and/or a stationary storage device, such as a refrigerator, is not available, such as picnics, camping, mobile food kiosks, hospitality or battlefield meal locations, search and rescue, etc. In addition to food, other stored items also require hygienic storage. For example, medical and chemical equipment, construction wood, etc., also require storage in a biologically safe environment. Since ambient temperature significantly affects bacterial activity, effective control of the ambient temperature is an important tool in ensuring reliable, hygienic storage of various items.

Fresh food products can be processed using ultraviolet light as a germicidal medium to reduce the food-born microbial load. Water has been treated with ultraviolet light to provide safe drinking water for quite some time. Fruit and vegetable products capable of being pumped through a system generally are very suitable for processing by ultraviolet light to reduce the microbial load. Today, most of these products are pasteurized to obtain microbiologically safe and nutritious products. However, pasteurization can change the taste and flavor of such products because of the temperature and processing time. Juices from different sources can be treated by exposure to ultraviolet light at different doses. On the other hand, variables such as exposure time, type of fruit product, juice color and juice composition, among other variables, need to be studied to obtain fruit products with reduced microbial load, increased shelf life and adequate sensory and nutritional characteristics. Reduction of microbial load through ultraviolet light application as a disinfection medium for food products other than liquids also is being studied. Moreover, ultraviolet technology could be a source for pasteurization of liquids, or disinfection of solid foods as an alternative technology, instead of thermal treatment or application of antimicrobial compounds.

The anti-microbial properties of UV-C light (Ultraviolet light-C band) are well-known to scientists and have been used since the 1930's to kill germs containing DNA and RNA (including bacteria, viruses, fungi and mold). UV-C light is invisible to the human eye. While UV-C light is invisible, given sufficient intensity and exposure, UV-C light can kill most of the germs responsible for causing disease in humans and animals. UV-C light can destroy the DNA and/or RNA (genetic material) of pathogens (disease-causing bacteria, viruses, mold, etc.). Once the DNA in a pathogen has been destroyed, the pathogen is either killed or deactivated; the pathogen can no longer function properly; and the pathogen can no longer reproduce.

In general, ultraviolet (UV) light is classified into three wavelength ranges: UV-C, from about 200 nanometers (nm) to about 280 nm; UV-B, from about 280 nm to about 315 nm; and UV-A, from about 315 nm to about 400 nm. Generally, ultraviolet light, and in particular, UV-C light is "germicidal," i.e., it deactivates the DNA of bacteria, viruses and other pathogens and thus destroys their ability to multiply and cause disease. This effectively results in sterilization of the microorganisms. Specifically, UV-C light causes damage to the nucleic acid of microorganisms by forming covalent bonds between certain adjacent bases in the DNA. The formation of these bonds prevents the DNA from being "unzipped" for replication, and the organism is neither able to produce molecules essential for life process, nor is it able to reproduce. In fact, when an organism is unable to produce these essential molecules or is unable to replicate, it dies. UV light with a wavelength of approximately between about 250 to about 280 nm provides the highest germicidal effectiveness. While susceptibility to UV light varies, exposure to UV energy for about 20 to about 34 milliwatt-seconds/cm$^2$ is adequate to deactivate approximately 99 percent of the pathogens.

Various approaches have sought to use ultraviolet light to disinfect a compartment, such as compartments found in refrigerators. For example, one approach proposes a plurality of small, low current UV lights which utilize the standard circuitry of the refrigerator to power the UV light source. Another approach uses a UV lamp installed in a top portion of the refrigerator and reflective lining throughout the interior to reflect the UV radiation throughout the compartment. Another approach provides a UV system with a single UV source attached to an internal sidewall of a refrigerator to radiate light to the entire compartment, or in the alternative, provide UV exposure to a limited compartment. Still another approach proposes an air cleaner for an internal compartment of a refrigerator, which utilizes a UV filter to reduce pathogens in the re-circulated air. Still another approach provides a refrigerator with UV light irradiation components to eradicate low-level light from the storage containers contained therein to promote freshness of foodstuffs.

Box-type UV sterilizers are well known for use in sterilizing all manner of objects, including contact lenses, combs and safety goggles. Often only a single source of radiation is employed in these sterilizers and, as such, there are often areas on an object to be sterilized that are shadowed from the UV radiation produced from the single source. Furthermore, the object to be sterilized is often required to rest on a support during the sterilization process. When the support is not transparent to the UV radiation, the support also contributes to shadowing the object to be sterilized from the UV radiation.

Various approaches have been used in decontaminating surfaces through the use of ultraviolet light. One approach includes a mobile germicidal system for decontaminating walls and a ceiling of a room, in which germicidal lamps are positioned adjacent the wall and/or ceiling to thereby sterilize the surface. Another approach proposes an ultraviolet air sterilization device for connection to an air handling duct for the purpose of sterilizing the air as it flows through the duct. Still another approach describes a wheeled carriage with a handle to allow the operator to move the sterilization device over a floor. Other approaches seek to provide a handheld device for moving across a surface to eradicate undesirable elements thereon, a mobile disinfectant device and method using ultraviolet light to sterilize a surface; and a UV spot curing system for hardening epoxy material using a wand emitting ultraviolet light.

SUMMARY OF THE INVENTION

Many previous proposals utilizing ultraviolet radiation incorporate optical elements, such as reflectors, to direct ultraviolet light to a desired location, such as onto a surface requiring disinfection. However, the inventors recognize that use of such optical elements can significantly reduce an overall efficiency of the system due to a generally large absorbance of ultraviolet radiation. Furthermore, diffused ultraviolet light can be absorbed by surfaces that do not require disinfection, such as walls of a container in which article(s) requiring disinfection are placed. Other applications also may include a surface that can move relative to a location of the ultraviolet source(s), which therefore presents a challenge with respect to focusing the ultraviolet radiation onto the surface for the various possible locations of the surface.

The inventors provide a solution for treating (e.g., sterilizing, preserving, and/or the like), stored item(s) within a storage area using ultraviolet radiation. For example, an embodiment is configured to focus ultraviolet radiation in a beam directed towards a surface of an object to be treated. The motion of the beam can be adjusted depending on feedback data acquired while monitoring, for example, bioactivity on the surface or depending on a position of an article requiring treatment. An embodiment is configured to monitor biodegradable and/or other consumable items within a storage area and determine and apply a target amount of ultraviolet radiation or specific motion of an ultraviolet beam to preserve and/or sterilize the item(s), without affecting the quality of the items. Embodiments can be implemented in any of various types of storage environments, such as refrigerators, pantries, reusable grocery bags, coolers, boxes, biological and/or sterile object storage containers, and/or the like.

Aspects of the invention provide a solution for treating a surface with ultraviolet radiation. A movable ultraviolet source is utilized to emit a beam of ultraviolet radiation having a characteristic cross-sectional area smaller than an area of the surface to be treated. The movable ultraviolet source can be moved as necessary to directly irradiate any portion of the surface with radiation within the characteristic cross-sectional area of the beam of ultraviolet radiation. The movement can include, for example, rotational movement and/or repositioning the movable ultraviolet source with respect to the surface.

A first aspect of the invention provides a container comprising: at least one object having a surface targeted for treatment; a movable ultraviolet source, wherein the movable ultraviolet source emits a beam of ultraviolet radiation having a characteristic cross-sectional area smaller than an area of the surface; and means for moving the movable ultraviolet source to irradiate any portion of the surface with radiation within the characteristic cross-sectional area of the beam of ultraviolet radiation.

A second aspect of the invention provides a treatment device comprising: a movable ultraviolet source, wherein the movable ultraviolet source emits a beam of ultraviolet radiation having a characteristic cross-sectional area smaller than an area of a surface to be treated; and means for moving the movable ultraviolet source to irradiate any portion of the surface with radiation within the characteristic cross-sectional area of the beam of ultraviolet radiation.

A third aspect of the invention provides an enclosure comprising: a consumable object; a surface targeted for treatment, wherein a location of the surface varies according to an amount of the consumable object; a movable ultraviolet source mounted to an interior surface of the enclosure, wherein the movable ultraviolet source emits a beam of ultraviolet radiation having a characteristic cross-sectional area smaller than an area of the surface; and means for moving the movable ultraviolet source to directly irradiate any portion of the surface with ultraviolet radiation within the characteristic cross-sectional area of the beam of ultraviolet radiation.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for treating a surface with ultraviolet radiation. A movable ultraviolet source is utilized to emit a beam of ultraviolet radiation having a characteristic cross-sectional area smaller than an area of the surface to be treated. The movable ultraviolet source can be moved as necessary to directly irradiate any portion of the surface with radiation within the characteristic cross-sectional area of the beam of ultraviolet radiation. The movement can include, for example, rotational movement and/or repositioning the movable ultraviolet source with respect to the surface.

As used herein, unless otherwise noted, the term "set" means one or more (i.e., at least one) and the phrase "any solution" means any now known or later developed solution. Furthermore, as used herein, ultraviolet radiation/light means electromagnetic radiation having a wavelength ranging from approximately 10 nanometers (nm) to approximately 400 nm, while ultraviolet-C (UV-C) means electromagnetic radiation having a wavelength ranging from approximately 100 nm to approximately 280 nm, ultraviolet-B (UV-B) means electromagnetic radiation having a wavelength ranging from approximately 280 to approximately 315 nanometers, and ultraviolet-A (UV-A) means electromagnetic radiation having a wavelength ranging from approximately 315 to approximately 400 nanometers.

As also used herein, a material/structure is "transparent" when the material/structure allows at least ten percent of radiation having a target wavelength, which is radiated at a normal incidence to an interface of the layer, to pass there through. Furthermore, as used herein, a material/structure is "reflective" when the material/structure has a reflection coefficient of at least thirty percent for radiation having a target wavelength. In a more particular embodiment, a material/structure is "highly reflective" when the material/structure has a reflection coefficient of at least eighty percent for radiation having a target wavelength. In an embodiment, the target wavelength of the radiation corresponds to a wavelength of radiation emitted or sensed (e.g., peak wavelength+/−five nanometers) by an active region of an optoelectronic device during operation of the device. For a given layer, the wavelength can be measured in a material of consideration and can depend on a refractive index of the material.

Aspects of the invention provide a solution in which surface(s) are sterilized using ultraviolet radiation. To this extent, the ultraviolet radiation can be directed at the surface(s) in such a manner as to harm (e.g., suppress growth of, reduce an amount of, kill, damage, injure, etc.) any organisms that may be present on the surface(s). The organism(s) can comprise any combination of various types of organisms, such as bacteria, viruses, protozoa, biofilms, mold, and/or the like. The discussion herein refers to the sterilization of one or more surfaces. As used herein, "sterilizing" and "sterilization" refer to harming one or more target organisms, and include purification, disinfection, sanitization, and/or the like. Furthermore, as used herein a "sterilized surface" includes a surface that is devoid of any live organisms, a surface that is devoid of any live targeted organisms (but which may include non-targeted organisms), and a surface that includes some live targeted organism(s), but which is substantially free of such organism(s).

Figure 1:
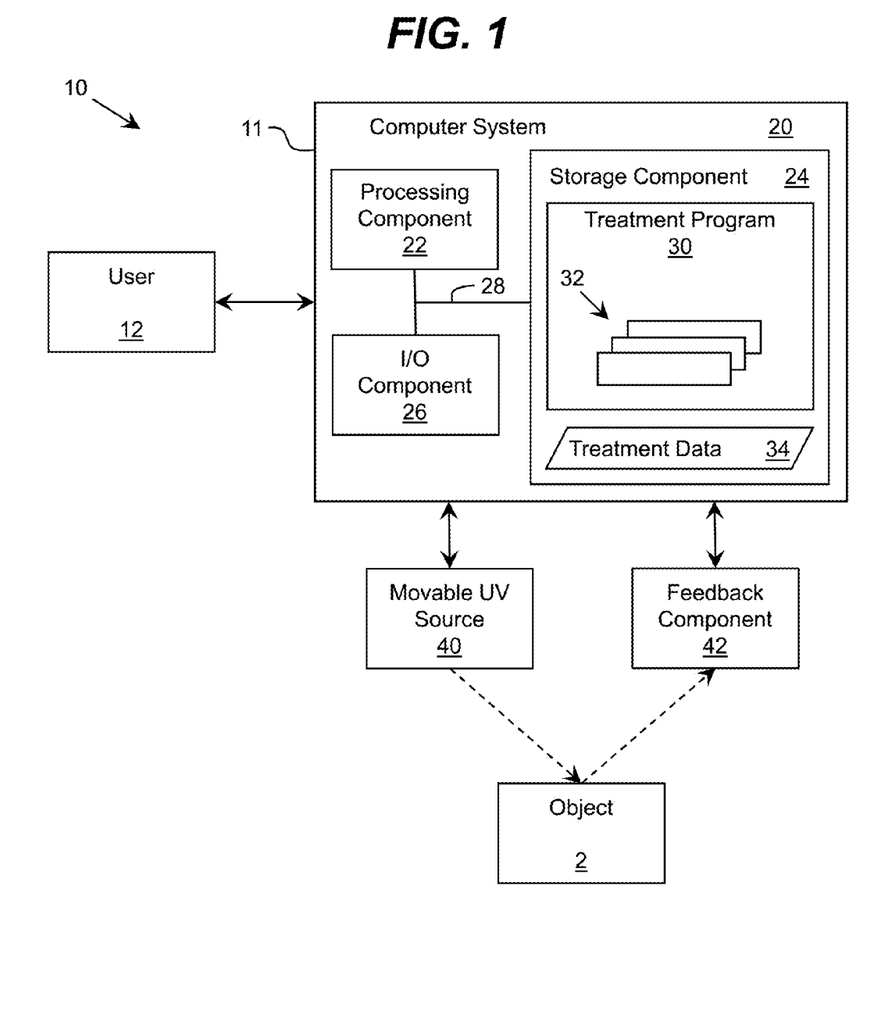
FIG. 1 shows an illustrative treatment system according to an embodiment.

Turning to the drawings, FIG. 1 shows an illustrative treatment system 10 according to an embodiment. To this extent, the treatment system 10 includes a monitoring and/or control system 11, which is shown implemented as a computer system 20 that can perform a process described herein in order to treat one or more surfaces of an object 2. In particular, the computer system 20 is shown including a treatment program 30, which makes the computer system 20 operable to treat the surface(s) of the object 2 with ultraviolet radiation emitted by a set of movable UV sources 40 by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the treatment program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the treatment program 30 can manage a set of interfaces (e.g., graphical user interface(s), application program interface, and/or the like) that enable human and/or system users 12 to interact with the treatment program 30. Furthermore, the treatment program 30 can manage (e.g., store, retrieve, create, manipulate, organize, present, etc.) the data, such as treatment data 34, using any solution.

In any event, the computer system 20 can comprise one or more general purpose computing articles of manufacture (e.g., computing devices) capable of executing program code, such as the treatment program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the treatment program 30 can be embodied as any combination of system software and/or application software.

Furthermore, the treatment program 30 can be implemented using a set of modules 32. In this case, a module 32 can enable the computer system 20 to perform a set of tasks used by the treatment program 30, and can be separately developed and/or implemented apart from other portions of the treatment program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the treatment program 30 fixed thereon (e.g., one or more modules 32). However, it is understood that the computer system 20 and the treatment program 30 are only representative of various possible equivalent computer systems that may perform a process described herein. To this extent, in other embodiments, the functionality provided by the computer system 20 and the treatment program 30 can be at least partially implemented by one or more computing devices that include any combination of general and/or specific purpose hardware with or without program code. In each embodiment, the hardware and program code, if included, can be created using standard engineering and programming techniques, respectively. In another embodiment, the monitoring and/or control system 11 can be implemented without any computing device, e.g., using a closed loop circuit implementing a feedback control loop in which the outputs of one or more sensing devices are used as inputs to control the operation of one or more other devices. Illustrative aspects of the invention are further described in conjunction with the computer system 20. However, it is understood that the functionality described in conjunction therewith can be implemented by any type of monitoring and/or control system 11.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the treatment program 30 enables the computer system 20 to treat surface(s) of the object 2. To this extent, the computer system 20 can operate a movable ultraviolet (UV) source 40 to direct ultraviolet radiation onto one or more surfaces of the object 2 in order to sanitize the surface(s). Furthermore, the computer system 20 can receive feedback data regarding a surface of the object 2 from a feedback component 42, which can include one or more sensing devices for acquiring data regarding the surface of the object 2 using any solution. In an embodiment, the treatment system 10 includes control component(s), power component(s), control logic, and/or the like, capable of being implemented and operated in various different operating configurations as described in U.S. patent application Ser. No. 14/012,682, filed on 28 Aug. 2013, which is hereby incorporated by reference. Additional aspects of the invention are shown and described in conjunction with illustrative environments in which the treatment system 10 can be utilized.

In an embodiment, during an initial period of operation (e.g., after recent access to the object 2, addition/removal/reconfiguration of the object 2, and/or the like), the computer system 20 can acquire data from the feedback component 42 regarding one or more attributes of the object 2 and/or conditions of an area within which the object 2 is located and generate treatment data 34 for further processing. The treatment data 34 can include information on, for example, the color, appearance, and/or the like, of the object 2, the presence of microorganisms on the object 2 or within the area, and/or the like. Furthermore, the treatment data 34 can include information regarding the presence of ethylene gas within the area. The computer system 20 can use the treatment data 34 to control one or more aspects of the ultraviolet radiation generated by the movable UV source 40 as discussed herein. Furthermore, it is understood that one or more aspects of the operation of the movable UV source 40 can be controlled by a user 12, e.g., via an interface to the computer system 20. Such user-controlled operation can include preventing operation of the movable UV source 40, requesting operation of the movable UV source 40, request a particular mode of operation of the movable UV source 40, and/or the like.

Figure 2A:
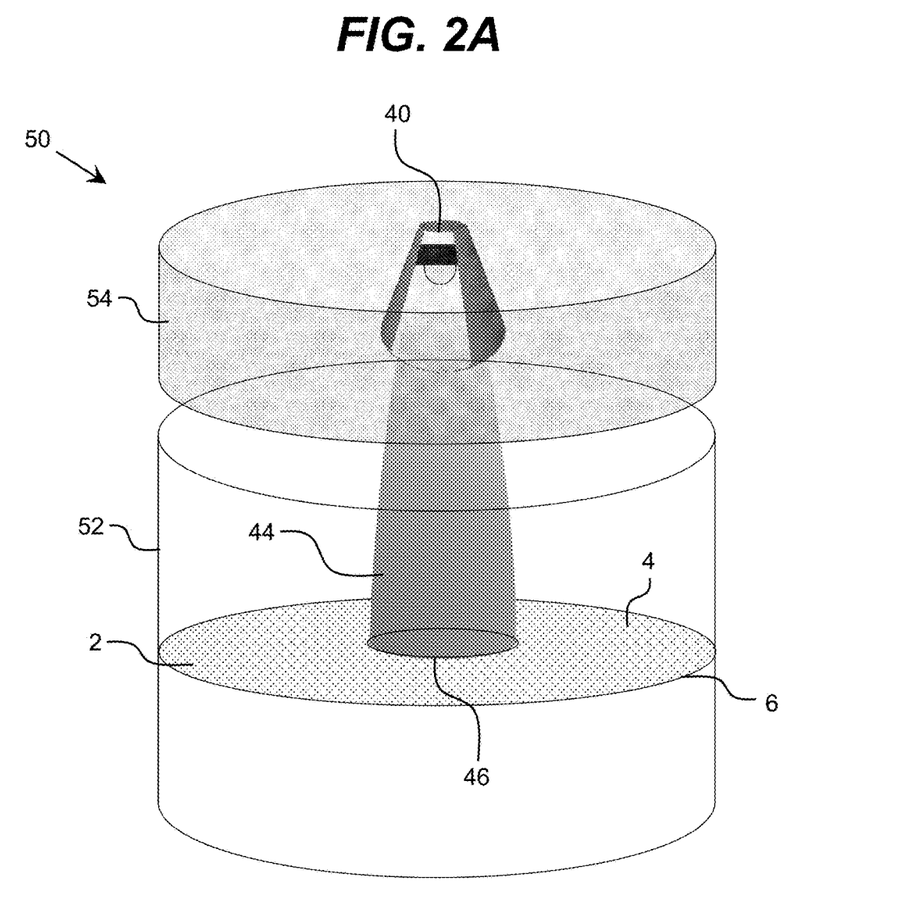
FIGS. 2A and 2B show an illustrative container according to an embodiment.

FIG. 2A shows an illustrative container 50 according to an embodiment. In this case, the container 50 includes a body 52 and a removable cover 54 (e.g., a cap, lid, and/or the like), which is configured to enclose an interior area defined by the body 52. While a cylindrical container 50 is shown, it is understood that the container 50 can have any shape (e.g., a box). The container 50 can be formed of any material suitable for the corresponding application. In an embodiment, at least an interior surface of the container 50 is formed of a highly ultraviolet reflective material. Illustrative ultraviolet reflective materials include a reflective fluoropolymer, such as PTFE, and/or the like, a UV reflective film formed of aluminum (e.g., polished aluminum), a highly ultraviolet reflective expanded polytetrafluoroethylene (ePTFE) membrane (e.g., GORE® Diffuse Reflector Material), and/or the like. Regardless, the container 50 further includes a movable UV source 40, which is configured to direct an ultraviolet radiation beam 44 onto a surface 4 in order to sanitize the surface 4. As illustrated, the movable UV source 40 can be located in the removable cover 54, although it is understood that this is only illustrative of various locations where a movable UV source 40 can be mounted.

The surface 4 can be a surface of any type of object 2 located within the container 50. For example, the surface 4 can correspond to a top surface of a consumable product, such as a cosmetic, stored within the container 50. Alternatively, the surface 4 can correspond to a surface of an object 2 (e.g., a piston) utilized in dispensing a consumable product (e.g., a cosmetic), which is capable of moving vertically within the body 52. In either case, during use of the consumable product, the surface 4 moves relative to the location of the movable UV source 40. However, it is understood that a cosmetic and a piston are only illustrative of various types of objects 2. To this extent, illustrative objects 2 include: an interior surface of the container 50, a top surface of another type of consumable item, such as a perishable food item (e.g., pasta sauce, salad dressing, milk, fruit, and/or the like), an exposed surface of an object 2 included to prevent air from contacting the consumable item, and/or the like.

As illustrated, the ultraviolet radiation beam 44 has a cross-sectional area 46 significantly smaller than a cross-sectional area 6 of the surface 4. In an embodiment, the cross-sectional area 46 is significantly smaller than the cross-sectional area 6 regardless of a distance, relevant for the corresponding application, between the surface 4 and the movable UV source 40. For example, the cross-sectional area 46 can remain significantly smaller than the cross-sectional area of an interior defined by the body 52 even at the bottom surface of the body 52 opposite the location of the movable UV source 40. Regardless, the movable UV source 40 can be capable of irradiating only a portion of the cross-sectional area 6 of the surface 4. In an embodiment, a characteristic cross-sectional area of the ultraviolet radiation beam 44 (i.e., the cross-sectional area including at least ninety percent of the power contained within the ultraviolet radiation beam 44) is smaller than an area of the surface 4. In an embodiment, the ultraviolet radiation beam 44 has a maximum cross-sectional area when impacting the surface 4 that is no more than eighty percent of the cross-sectional area of the surface 4. However, it is understood that the cross-sectional area can be significantly smaller relative to the cross-sectional area of the surface 4. Furthermore, it is understood that a relative size of the cross-sectional area of the beam 44 can vary, e.g., when the surface 4 is located closer to or further from the UV source 40.

Figure 2B:
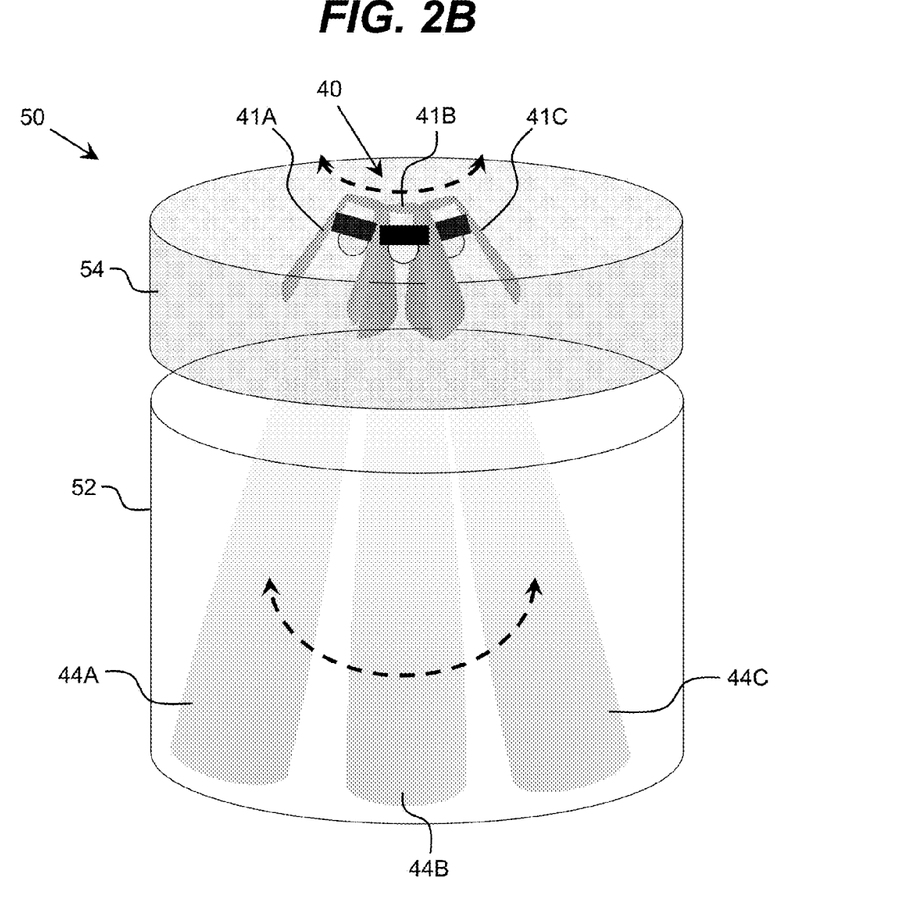

To this extent, the movable UV source 40 can include one or more components configured to be moved in a manner that enables the ultraviolet radiation beam 44 to be selectively directed towards different sub-areas corresponding to substantially all of the surface 4 for irradiation. In an embodiment, the computer system 20 (FIG. 1) can adjust a relative angle formed between the ultraviolet radiation beam 40 (e.g., a central axis of the ultraviolet radiation beam 40) and the surface 4. For example, the computer system 20 can selectively rotate the movable UV source 40 about an axis to enable the ultraviolet radiation beam 44 to be selectively directed towards any region of the surface 4. To this extent, FIG. 2B shows the container 50 with the movable UV source 40 shown rotated into three different positions 41A-41C. As illustrated, each position 41A-41C results in the corresponding ultraviolet radiation beam 44A-44C, respectively, being directed in a distinct direction, each of which impacts a surface (e.g., the surface 4 shown in FIG. 2A) at a unique angle and in a unique sub-region of the surface.

In an embodiment, the computer system 20 can adjust a position of the movable UV source 40 with respect to the surface 4. For example, the computer system 20 can reposition the movable UV source 40 within the removable cover 54 of the container 50. In this case, the movable UV source 40 can be relocated within a lateral plane mostly parallel to the surface 4. Additionally, the computer system 20 can reposition the movable UV source 40 in a plane mostly perpendicular to the surface 4. In an embodiment, the computer system 20 can relocate the movable UV source 40 to a different position (in a parallel and/or perpendicular plane to the surface 4) and rotate the movable UV source 40 about one or more axes.

Figure 3A:
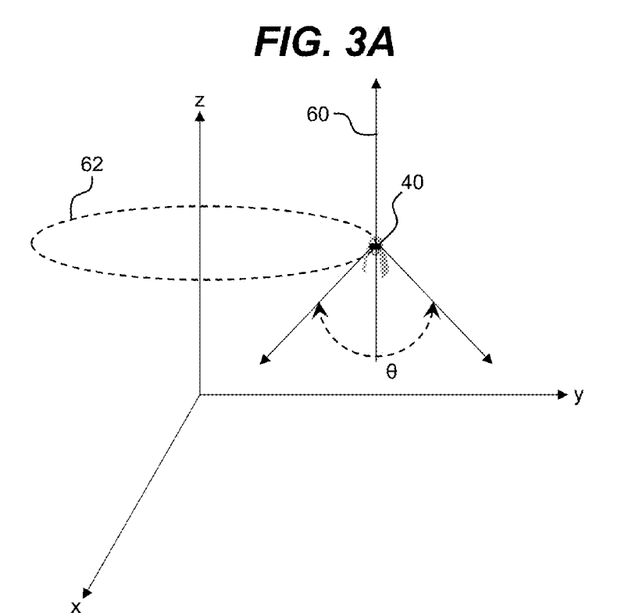
FIGS. 3A and 3B illustrate possible motions of a movable UV source according to embodiments.
Figure 3B:
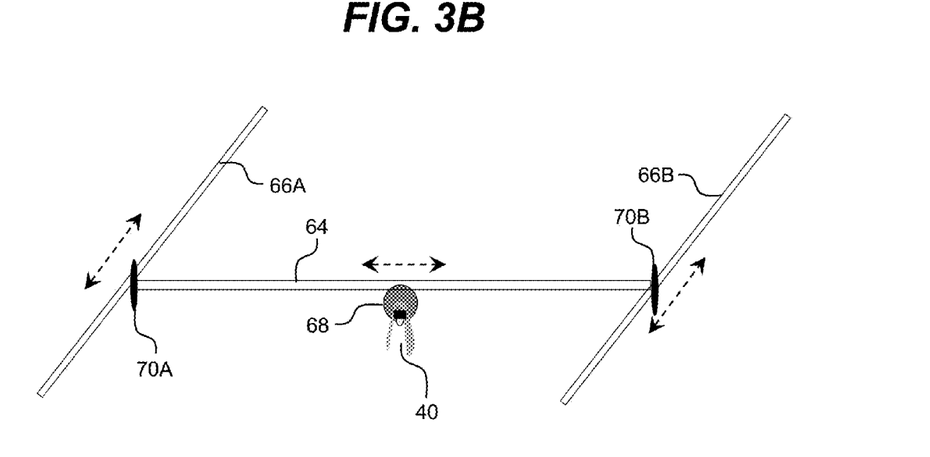

To this extent, FIGS. 3A and 3B illustrate possible motions of a movable UV source 40 according to embodiments. In FIG. 3A, the computer system 20 can rotate the movable UV source 40 about its z-axis 60 within a range of angles $\theta$. Additionally, the computer system 20 can reposition the movable UV source 40 to any position located along an elliptical path 62, which can be mostly parallel to a surface 4 (FIG. 2A) being irradiated. In an embodiment, the movable UV source 40 also can be repositioned along the z-axis 60. In FIG. 3B, the computer system 20 can reposition the movable UV source 40 along a linear path 64 (e.g., a rail), and the computer system 20 also can reposition the linear path 64 along a pair of linear paths 66A, 66B. For example, the movable UV source 40 can be attached to the linear path 64 via a wheel assembly 68 selectively rotatable by the computer system 20. Similarly, the linear path 64 can be attached to the linear paths 66A, 66B (e.g., rails) via wheel assemblies 70A, 70B, which are also selectively rotatable by the computer system 20. In this manner, the computer system 20 can position the movable UV source 40 in any location corresponding to a region defined by the linear paths 66A, 66B.

It is understood that various alternative solutions for repositioning the movable UV source 40 can be utilized. For example, another solution can utilize a rotatable and/or extendible arm. Such an arm can be utilized to reposition the movable UV source 40 in a direction parallel and/or perpendicular to the surface 4. Furthermore, the movable UV source 40 can be repositioned in a vertical direction by sliding along a vertical cylinder, with possibility of being attached to a spring having compressive and extensive motion. Other possibilities include a movable UV source 40 attached to a pendulum.

It is understood that a movable UV source 40 can be configured to be repositioned (e.g., linearly, elliptically, and/or the like) and/or rotated using any solution, which will enable the movable UV source 40 to successfully irradiate multiple sub-regions of a desired region (e.g., substantially all) of a surface, such as the surface 4 shown in FIG. 2A, which can vary in distance from the movable UV source 40. To this extent, a particular combination of a range of angles $\theta$ and two or three dimensional positions can be utilized to provide the desired coverage by the movable UV source 40.

Figure 4:
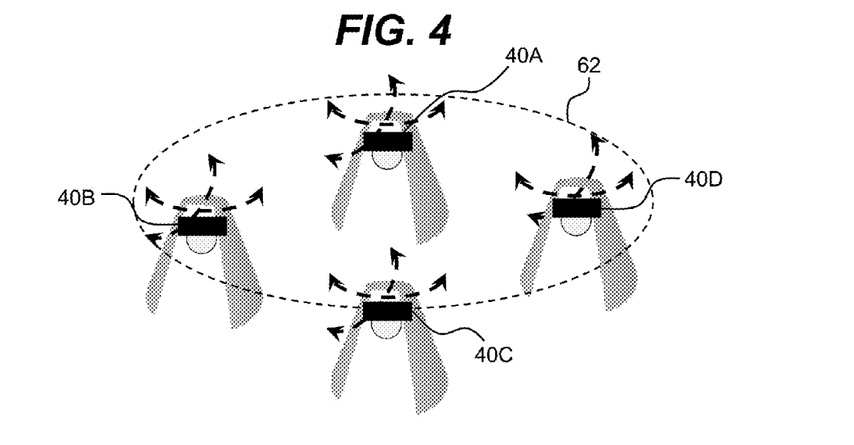
FIG. 4 shows an illustrative group of movable UV sources according to an embodiment.

Additionally, while only a single movable UV source 40 is shown, it is understood that embodiments can include any number of one or more movable UV sources 40, which can be rotated, repositioned, turned on/off, and/or the like, by a computer system 20 as a group and/or individually. To this extent, FIG. 4 shows an illustrative group of movable UV sources 40A-40D according to an embodiment. As illustrated, each movable UV source 40A-40D can be rotated about two axes. In an embodiment, the computer system 20 can independently rotate each movable UV source 40A-40D about one or both of the axes. Furthermore, each movable UV source 40A-40D can be repositioned along an elliptical path 62. In an embodiment, the computer system 20 can reposition the movable UV sources 40A-40D as a group. In another embodiment, the computer system 20 can independently reposition each movable UV source 40A-40D over a limited region of the elliptical path 62.

Rotation and/or adjustment of the position of a movable UV source 40 can be accomplished using any mechanism. An illustrative mechanism includes a mount selectively rotatable in one or more axes (e.g., x, y and/or z axes) and/or repositionable in one or more directions to which the movable UV source 40 is attached. The mount can be rotatable over an entire axis or only a portion of an axis. For example, the mount can enable angular motion of the movable UV source 40 in the azimuthal and the zenith or polar angles (which are equivalent to angles phi and theta in spherical coordinates). The mount can include a built-in mechanism, such as an electrical motor, which enables the mount to be selectively rotated along an axis by the computer system 20 and/or selectively repositioned along a path (e.g., a rail, a toothed bar/rod, and/or the like) by the computer system 20. Alternatively, the computer system 20 can control a separate mechanism, which in turn causes the mount to rotate and/or relocate along a path. Regardless, illustrative mechanisms for rotating and/or repositioning the movable UV source 40 include: an electrical motor; an electromagnet; a spring; a permanent magnet; a vibration generator (e.g., induced by a piezoelectric actuator); oscillation of strings connected to the movable UV source 40; piezo-actuated motion; and/or the like. In each case, the various component(s) utilized to rotate and/or reposition the movable UV source 40 can be implemented within the system 10 (FIG. 1) using any solution, e.g., attached to any combination of various components of the system 10.

It is understood that rotation and/or repositioning of a movable UV source 40 can include rotation and/or repositioning of only one or more components of the movable UV source 40 to adjust an angle and/or position of a resulting beam 44 (FIG. 2). For example, an embodiment of the movable UV source 40 can include a wave guiding structure which can be rotated with respect to an ultraviolet light source. In this case, rotation of a movable UV source 40 can be accomplished by rotating only the wave guiding structure, and not the ultraviolet light source. Similarly, a set of ultraviolet light sources may be located physically apart from a portion of a set of wave guiding structures from which beam(s) 44 is (are) emitted. For example, an optical fiber can direct light emitted by an ultraviolet light source to a wave guiding structure located some distance away. In this case, repositioning of a movable UV source 40 can be accomplished by repositioning only the wave guiding structure(s) while the ultraviolet light source(s) remain in a fixed location.

As discussed herein, the computer system 20 can rotate and/or reposition one or more movable UV sources 40 described herein in order to irradiate only a portion of a cross-sectional area 6 (FIG. 2A) of a surface 4 (FIG. 2A). In an embodiment, the computer system 20 operates a movable UV source 40 to irradiate a targeted area of surface 4, which requires treatment (e.g., sterilization). Furthermore, when multiple movable UV sources are utilized, the computer system 20 can operate two or more movable UV sources 40 to concurrently irradiate a targeted area of a surface 4 (e.g., to provide a higher dose) or to concurrently irradiate distinct targeted areas of the surface 4, which may be non-overlapping or partially overlapping. Regardless, the computer system 20 can identify the targeted area(s) and/or direct the ultraviolet radiation onto the targeted area(s) using treatment data 34 (FIG. 1) received from one or more sensing devices of a feedback component 42 (FIG. 1).

Figure 5:
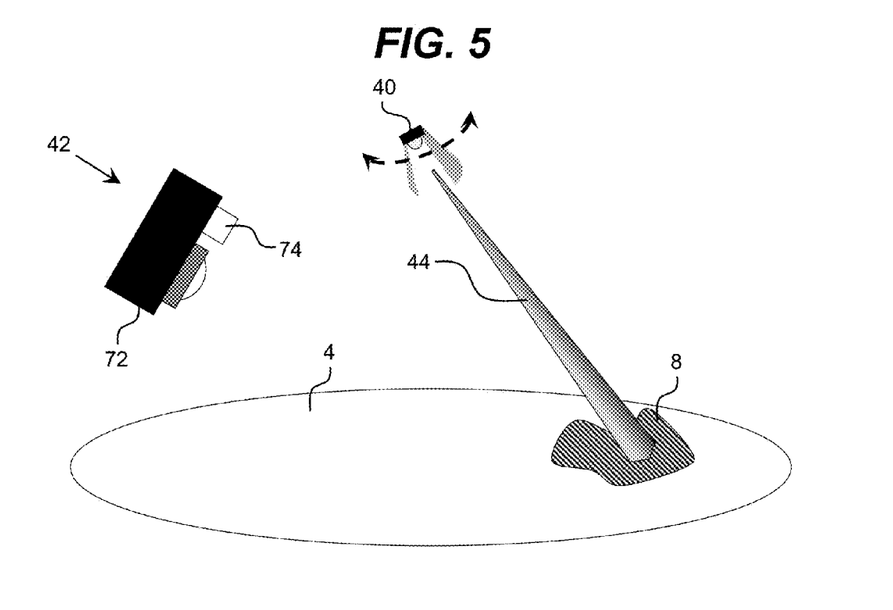
FIG. 5 shows an illustrative movable UV source and feedback component according to an embodiment.

For example, FIG. 5 shows an illustrative movable UV source 40 and feedback component 42 according to an embodiment. In this case, the feedback component 42 can include a set of imaging devices 72 and a corresponding light source 74. The computer system 20 can operate the light source 74 to provide illumination of some or all of the surface 4 for imaging by the imaging device(s) 72. In an embodiment, the imaging device(s) 72 can be located in a fixed position and configured to acquire image data including substantially all of the surface 4 in a single frame. Alternatively, the computer system 20 can move the imaging device(s) 72 and/or light source 74 to image the surface 4 in multiple frames. In the latter case, the imaging device(s) 72 and/or light source 74 can be mounted and rotated and/or repositioned by the computer system 20 using a solution described in conjunction with the movable UV source 40.

The computer system 20 can process the image data to identify an area 8 on the surface 4 requiring treatment using any solution. For example, the light source 74 can be a visible light source, which can be operated in conjunction with a camera 72 to acquire image data of the surface 4. The computer system 20 can process the image data and identify the area 8, e.g., based on discoloration of the area 8. However, it is understood that this is only illustrative, and other types of light and/or imaging devices can be utilized, such as infrared, ultraviolet, and/or the like. Similarly, it is understood that the feedback component 42 can be configured to acquire other types of data, such as data regarding a presence of one or more compounds indicating contamination (e.g., ethylene), fluorescence data acquired by one or more fluorescent sensors, and/or the like. In an embodiment, the computer system 20 can process the data acquired by the feedback component 42 to determine a presence of biological activity and correlate the determined presence with target area(s) 8 requiring treatment, a level of treatment required, and/or the like.

Regardless, the computer system 20 can rotate and/or reposition the movable UV source 40 in order to direct the beam 44 onto the target area 8 requiring treatment. Furthermore, when the beam 44 only covers a portion of the identified target area 8, the computer system 20 can further rotate and/or reposition the movable UV source 40 to deliver a desired dose of ultraviolet radiation onto all of the target area 8. In an embodiment, the computer system 20 can further utilize image data acquired by the feedback component 42 to triangulate a location of the target area 8, adjust the angle and/or position of the movable UV source 40, and/or the like.

In an embodiment, the movable UV source 40 is configured to emit a focused beam 44 to deliver a more concentrated dose of ultraviolet radiation to a smaller region. To this extent, an embodiment of the movable UV source 40 can comprise one or more ultraviolet lasers, such as one or more ultraviolet laser diodes. In an embodiment, the movable UV source 40 can include one or more ultraviolet light sources, such as ultraviolet light emitting diode(s), with a light guiding structure configured to focus the emitted ultraviolet light into a more focused beam 44. A focused beam 44 can provide an increased flux of ultraviolet radiation delivered to the target area 8 and a smaller target area 8 being illuminated with ultraviolet radiation.

Figure 6:
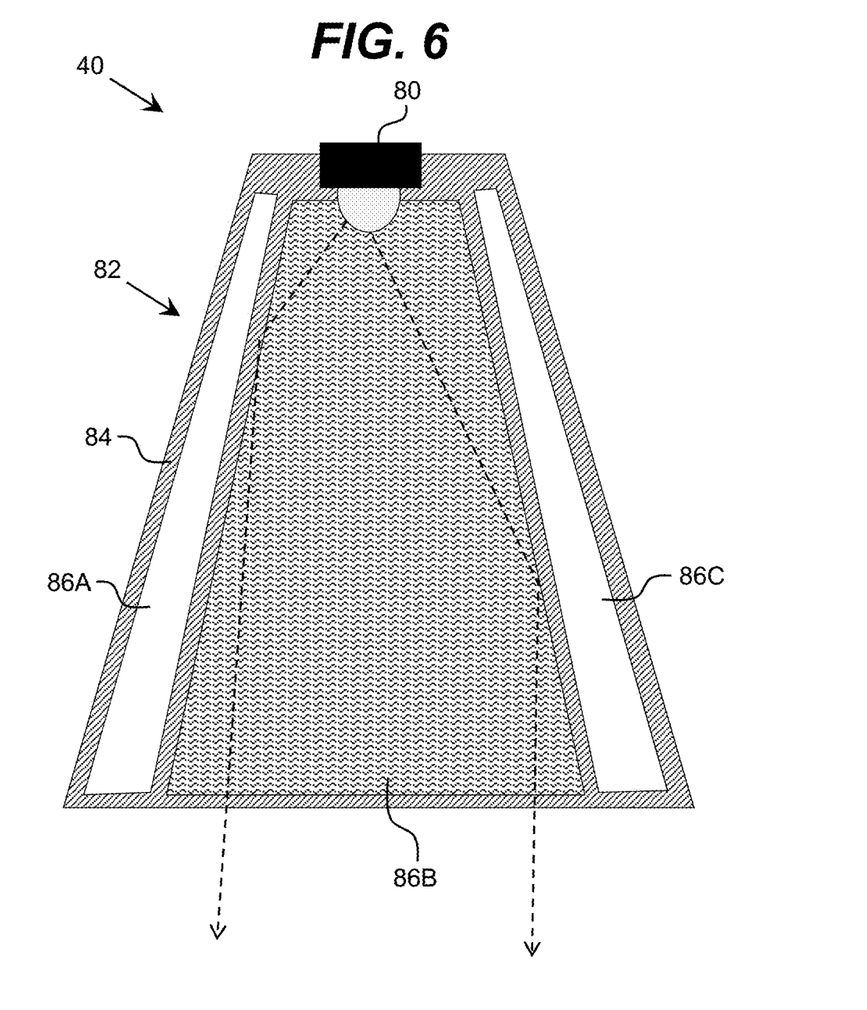
FIG. 6 shows a cross-section of an illustrative movable UV source according to an embodiment.

FIG. 6 shows a cross-section of an illustrative movable UV source 40 according to an embodiment. In this case, the movable UV source 40 includes an ultraviolet light source 80 and a light guiding structure 82. While only a single ultraviolet light source 80 is shown, it is understood that a movable UV source 40 can include any number of one or more light sources 80. The light guiding structure 82 can be configured to redirect (e.g., collimate) light emitted from the ultraviolet light source 80 into a more focused beam of light 44 to be directed toward a target area 8 of a surface as shown in FIG. 5. When the light guiding structure 82 is utilized, light emitted from the ultraviolet light source 80 should couple well with the light guiding structure 82. In an embodiment, the coupling ensures at least fifty percent of the ultraviolet light emitted by the ultraviolet light source 80 enters the light guiding structure 82. In an embodiment, the light guiding structure 82 is configured to ensure a loss of no more than twenty percent of the ultraviolet radiation within the structure 82.

In an embodiment, the light guiding structure 82 can be formed of ultraviolet transparent material(s) and use total internal reflection to redirect the ultraviolet light emitted by the ultraviolet light source 80. Illustrative ultraviolet transparent materials include: fused silica, a fluoropolymer, sapphire, anodic aluminum oxide, air, a liquid such as purified water, and/or the like. In an illustrative embodiment, the light guiding structure 82 has a pyramid or conical cross-section expanding in a direction away from the ultraviolet light source 80. As illustrated, the light guiding structure 82 can include layers 84 formed of an ultraviolet transparent material, such as a fluoropolymer-based film, which form a set of regions 86A-86C, each of which can be filled with a transparent fluid. In this case, the ultraviolet light source 80 can be fused to the light guiding structure 82 using an ultraviolet transparent material, such as a fluoropolymer.

In a more particular embodiment, the regions 86A, 86C are filled with a gas having a low refractive index (e.g., at most ninety percent of the refractive index of the material forming the adjacent layers 84), such as ambient air, while the region 86B is filled with a liquid substantially transparent to ultraviolet radiation. In this case, the liquid can have a transparency at least similar (e.g., within ten percent) to the transparency of purified water for light wavelengths in the range of 240 nanometers to 360 nanometers. In an embodiment, the liquid in the region 86B is purified water as defined by the U.S. Food and Drug Administration. Alternatively, the liquid can be water sufficiently clean for human consumption (potable water). Fabrication of an illustrative light guiding structure 82 is shown and described in U.S. patent application Ser. No. 14/853,057, which was filed on 14 Sep. 2015, and which is hereby incorporated by reference. In another embodiment, the light guiding structure 82 is fabricated using anodized aluminum oxide (AAO) as shown and described in U.S. patent application Ser. No. 14/853,014, which was filed on 14 Sep. 2015, and which is hereby incorporated by reference.

However, it is understood that the light guiding structure 82 is only illustrative. For example, in another embodiment, a light guiding structure can include a parabolic structure having an internal surface formed of a reflective material, such as aluminum, onto which light is emitted from the ultraviolet light source 80 and collimated. Similarly, the light guiding structure 82 can be formed of a reflective material having a pyramid or conical cross-section expanding in a direction away from the ultraviolet light source 80 and an open bottom surface through which collimated ultraviolet radiation is emitted. In either case, the reflective material can reflect at least fifty percent of the ultraviolet radiation. Regardless, it is understood that references to "collimated ultraviolet radiation" include ultraviolet radiation not perfectly collimated, in which case the beam 44 (FIG. 5) will diverge over a distance, thereby having a conical shape. As used herein, the ultraviolet radiation is considered collimated when a cross-sectional area of the beam 44 exiting the movable UV source 40 is at least seventy percent of a cross-sectional area of the beam 44 after the beam 44 has traveled a maximum vertical distance h (shown in FIG. 7A) to impact a surface.

Figure 7A:
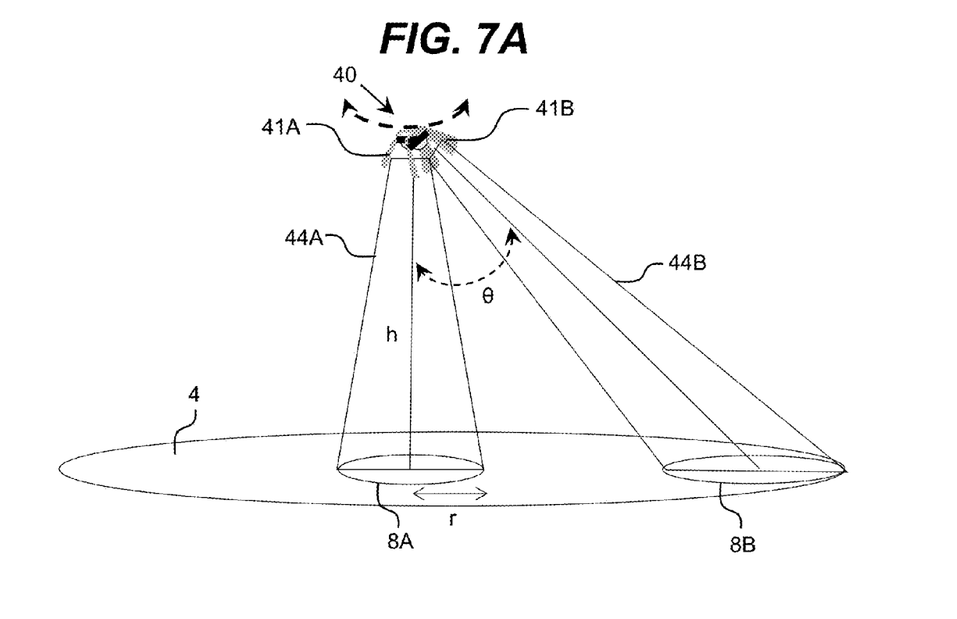
FIGS. 7A and 7B illustrate an embodiment accounting for angular rotation of the ultraviolet beam.
Figure 7B:
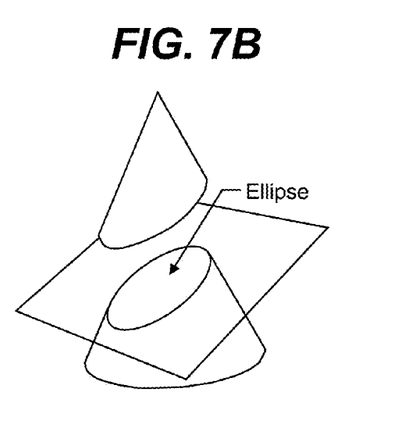

In an embodiment, the computer system 20 can account for differing angles θ and/or the divergence of the beam 44 when delivering a target dose of ultraviolet radiation to a target area 8 (FIG. 5). For example. FIGS. 7A and 7B illustrate an embodiment accounting for angular rotation of the ultraviolet beam 44A, 44B. As illustrated, when the movable UV source 40 is in a first position 41A in which the ultraviolet beam 44A is directed substantially perpendicular to a surface 4, the computer system 20 can determine a corresponding radius r of the target area 8A irradiated by the ultraviolet beam 44A (e.g., using data acquired by the feedback component 42 shown in FIG. 1). Assuming a known divergence of the ultraviolet beam 44A and/or a known distance h between the surface 4 and the movable UV source 40, the computer system 20 can determine the other of the distance h or the divergence of the ultraviolet beam 44A. Subsequently, assuming a surface 4 substantially parallel to the horizontal, when the movable UV source 40 is rotated an angle θ to a second position 41B, the computer system 20 can calculate a size of the target area 8B using the known variables and standard geometry. However, it is understood that the computer system 20 can account for variation in the angle of the surface 4 from horizontal by further analyzing the shape of the target area 8A and/or the target area 8B, e.g., using data acquired by the feedback component 42.

When treating (e.g., sterilizing) a surface 4, the computer system 20 can control the motion of the movable UV source 40 to ensure that a target radiation dose is delivered by the movable UV source 40 for each target area 8A, 8B on the surface 4. To this extent, the computer system 20 can account for changes in radiation intensity due to changes in the sizes of differing target areas 8A, 8B. For example, as the target area 8B is a larger size than the target area 8A, the intensity of the beam 44B when intersecting the surface 4 is correspondingly lower than the intensity of the beam 44A intersecting the surface 4. As a result, the computer system 20 can rotate the movable UV source 40 slower for larger angles θ to account for the lower intensity. As illustrated in FIG. 7B, the computer system 20 can calculate an increase in the target area 8B by utilizing an area of a conical section having an elliptical shape. Alternatively, the computer system 20 can rotate the movable UV source 40 using a set of discrete angles θ, with a particular time used for each angle θ to achieve a required dose of ultraviolet radiation for the corresponding target area 8A, 8B.

In addition to moving a movable UV source 40, the computer system 20 can perform one or more additional operations based on a desired treatment to be performed. For example, the computer system 20 can adjust an intensity of the ultraviolet beam 44A, 44B and/or a spectral power of the ultraviolet beam 44A, 44B, e.g., by adjusting power provided to the ultraviolet light source(s) 80 (FIG. 6). For example, the computer system 20 can turn on only a subset of multiple ultraviolet light sources 80 of a movable UV source 40, operate an ultraviolet light source 80 in pulsed mode, reduce or increase power supplied to the ultraviolet light source 80, and/or the like. Additionally, a movable UV source 40 can include a mechanism enabling the computer system 20 to adjust a focus (e.g., size of the characteristic cross-sectional area, collimation, and/or the like) of the ultraviolet beam 44A, 44B. For example, the movable UV source 40 can include a lens, an iris, and/or the like, which is/are operable by the computer system 20 to adjust a characteristic cross-sectional area and/or collimation of the ultraviolet beam 44A, 44B. In this case, the characteristic cross-sectional area and/or collimation of the ultraviolet beam 44A, 44B can be adjusted to be larger or smaller, e.g., based on a dose required to be delivered to a target area, a size of a target area, and/or the like.

While shown in FIGS. 2A and 2B in conjunction with a container 50 including a removable cover 54, it is understood that a solution described herein can be implemented in various types of enclosures in various types of environments. For example, an embodiment can be implemented within a storage area of a storage device configured to store at least one perishable item (e.g., food), such as a refrigerator, a compartment of a refrigerator, a container for biological objects, a cooler, a backpack, a food container, a plastic bag, a lunchbox, a pantry (e.g., a shelf in the pantry), and/or the like. Furthermore, while the container has been described as including cosmetics, it is understood that any type of consumable object can be stored in such a container 50, including a food item such as pasta sauce.

While shown and described herein as a method and system for treating a surface with ultraviolet light, it is understood that aspects of the invention further provide various alternative embodiments. For example, in one embodiment, the invention provides a computer program fixed in at least one computer-readable medium, which when executed, enables a computer system to treat a surface with ultraviolet light. To this extent, the computer-readable medium includes program code, such as the treatment program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the treatment program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for treating a surface with ultraviolet light. In this case, the generating can include configuring a computer system, such as the computer system 20 (FIG. 1), to implement a method of treating a surface with ultraviolet light described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A container comprising:
   at least one object having a surface targeted for treatment;
   a movable ultraviolet source, wherein the movable ultraviolet source emits a beam of ultraviolet radiation having a characteristic cross-sectional area smaller than an area of the surface in each direction, wherein the movable ultraviolet source includes:
      an ultraviolet light source configured to emit ultraviolet light; and
      an ultraviolet transparent light guiding structure configured to redirect at least a portion of the ultraviolet light emitted from the ultraviolet light source to form the beam of ultraviolet radiation; and
   means for moving the movable ultraviolet source to irradiate any portion of the surface with radiation within the characteristic cross-sectional area of the beam of ultraviolet radiation.

2. The container of claim 1, wherein the surface remains stationary in the container during the treatment.

3. The container of claim 1, wherein the means for moving includes means for rotating the ultraviolet transparent light guiding structure about an axis.

4. The container of claim 1, wherein the means for moving includes means for repositioning the ultraviolet transparent light guiding structure with respect to the surface.

5. The container of claim 1, wherein the means for moving includes means for rotating the movable ultraviolet source about an axis.

6. The container of claim 1, wherein the means for moving includes means for repositioning the movable ultraviolet source with respect to the surface.

7. The container of claim 1, wherein a distance between the surface and the movable ultraviolet source changes over time.

8. The container of claim 7, wherein the container stores a cosmetic.

9. The container of claim 1, wherein the movable ultraviolet source and the means for moving are located in a removable cover of the container.

10. A treatment device comprising:
    a movable ultraviolet source, wherein the movable ultraviolet source emits a beam of ultraviolet radiation having a characteristic cross-sectional area smaller than an area of a surface to be treated in each direction, wherein the movable ultraviolet source includes:
       a set of ultraviolet light emitting diodes; and
       a wave guiding structure configured to collimate ultraviolet light emitted by the set of ultraviolet light emitting diodes; and
    means for moving the movable ultraviolet source to irradiate any portion of the surface with radiation within the characteristic cross-sectional area of the beam of ultraviolet radiation.

11. The device of claim 10,
    wherein the surface remains stationary during the treatment.

12. The device of claim 10, wherein the means for moving enables rotation of the movable ultraviolet source through a range of angles about at least one axis.

13. The device of claim 10, wherein the means for moving enables repositioning of the movable ultraviolet source with respect to the surface to be treated.

14. The device of claim 10, further comprising a computer system configured to operate the means for moving and the movable ultraviolet source to treat the area of the surface with ultraviolet radiation of a target dose.

15. The device of claim 14, further comprising means for acquiring feedback data corresponding to at least one of: a location of the area of the surface to be treated or a location of a current area of the surface being irradiated by the beam of ultraviolet radiation, wherein the computer system adjusts operation of the means for moving based on the feedback data.

16. An enclosure comprising:
    a consumable object;
    a surface targeted for treatment, wherein a location of the surface varies according to an amount of the consumable object;
    a movable ultraviolet source mounted to an interior surface of the enclosure, wherein the movable ultraviolet source emits a beam of ultraviolet radiation having a characteristic cross-sectional area smaller than an area of the surface; and
    means for moving the movable ultraviolet source to directly irradiate any portion of the surface with ultraviolet radiation within the characteristic cross-sectional area of the beam of ultraviolet radiation.

17. The enclosure of claim 16, wherein the surface targeted for treatment is a surface of the consumable object.

18. The enclosure of claim 16, further comprising:
    a computer system configured to operate the means for moving and the movable ultraviolet source to treat the area of the surface with ultraviolet radiation of a target dose; and means for acquiring feedback data corresponding to at least one of: a location of the area of the surface to be treated or a location of a current area of the surface being irradiated by the beam of ultraviolet radiation, wherein the computer system adjusts operation of the means for moving based on the feedback data.

19. The enclosure of claim 18, wherein the means for moving includes means for rotating the movable ultraviolet source about an axis, and wherein the computer system further adjusts operation of the means for moving based on an angle of rotation of the movable ultraviolet source.

20. The enclosure of claim 16, wherein the movable ultraviolet source includes:
    a set of ultraviolet light emitting diodes; and
    an ultraviolet transparent light guiding structure configured to form the beam of ultraviolet radiation from light emitted by the set of ultraviolet light emitting diodes.

* * * * *